May 2, 1967  G. W. MISSON  3,317,302
METHOD OF MANUFACTURING FLAT GLASS ON A BI-LEVEL FORMING SURFACE
Original Filed Jan. 15, 1963  4 Sheets-Sheet 1

INVENTOR.
GEORGE W. MISSON
BY
Oscar L Spencer
ATTORNEY

INVENTOR.
GEORGE W. MISSON
BY Oscar L Spencer
ATTORNEY

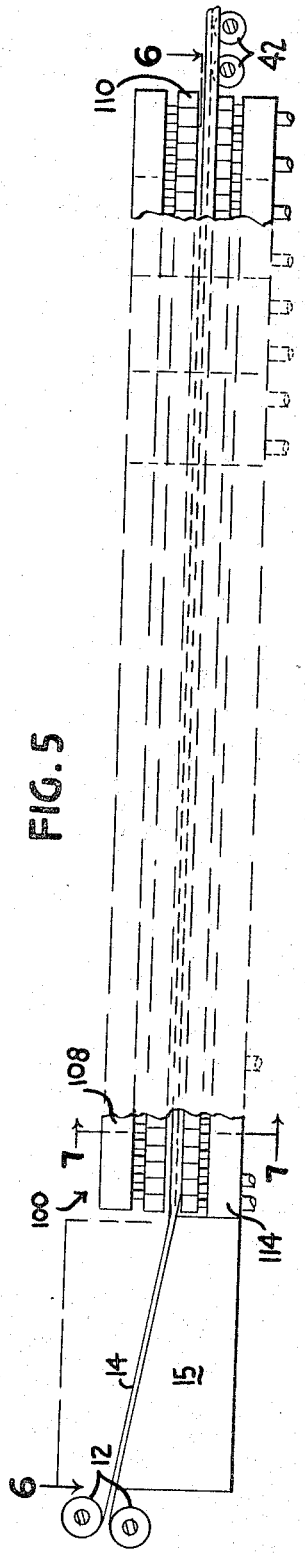
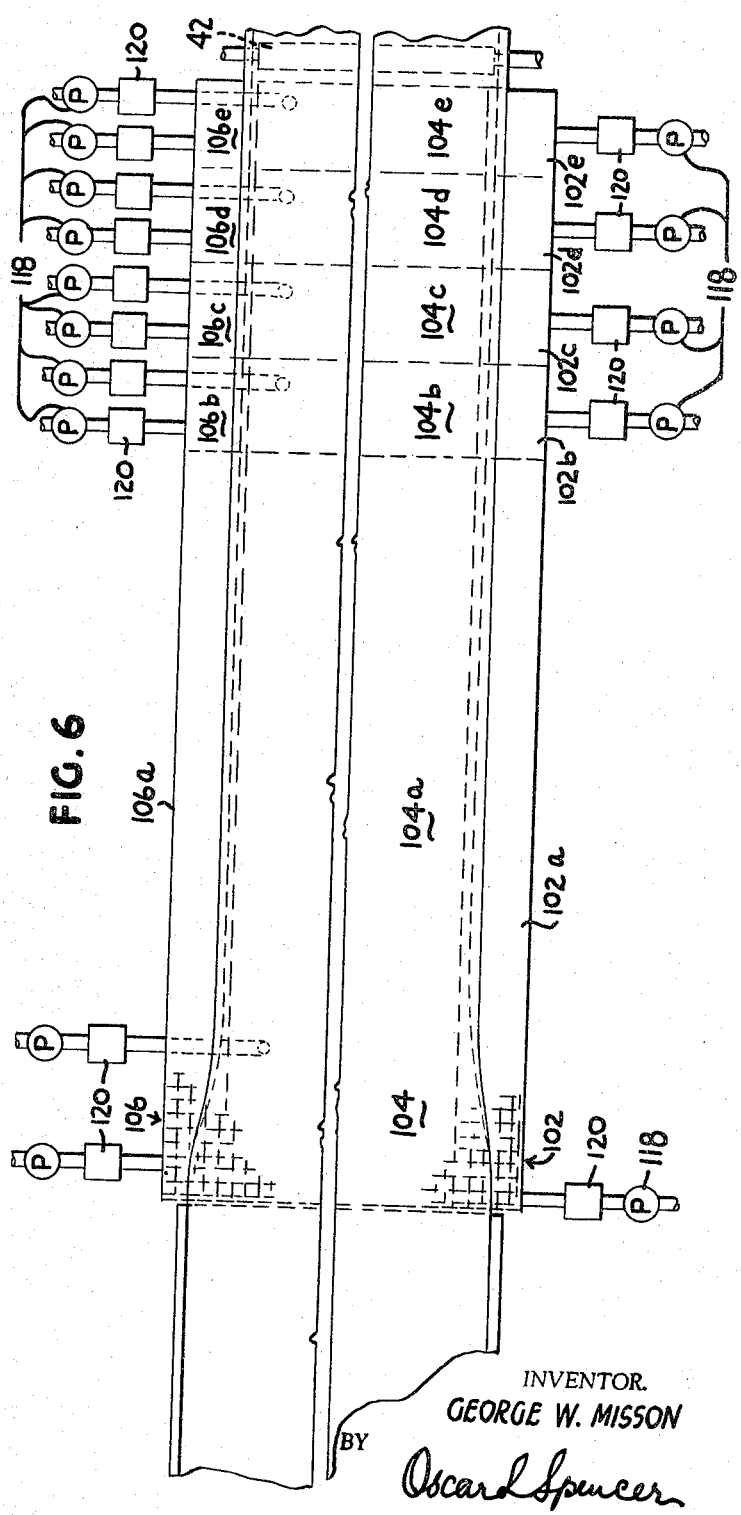

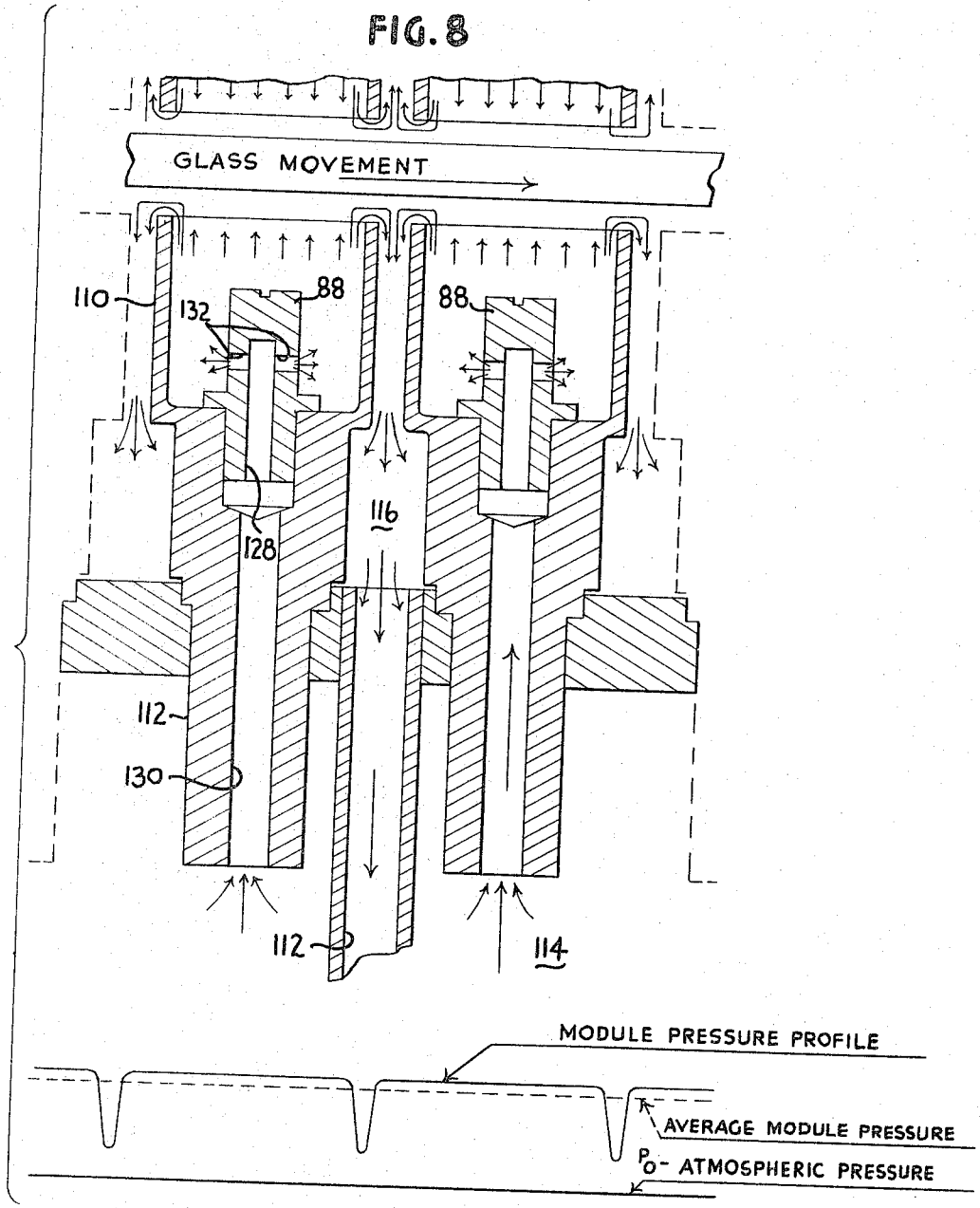

3,317,302
METHOD OF MANUFACTURING FLAT GLASS ON A BI-LEVEL FORMING SURFACE
George W. Misson, Pittsburgh, Pa., assignor to Pittsburgh Plate Glass Company, Pittsburgh, Pa., a corporation of Pennsylvania
Continuation of application Ser. No. 251,546, Jan. 15, 1963. This application Oct. 15, 1963, Ser. No. 316,311
4 Claims. (Cl. 65—99)

This application is a continuation of my copending application Ser. No. 251,546, filed Jan. 15, 1963, entitled, "Manufacture of Glass," now abandoned.

This application relates to the manufacture of flat glass by floating glass on a fluid, such as a gas or a liquid, for example, air or molten metal, respectively, so that the resultant flat glass has fire-finished surfaces requiring little or no additional surfacing for ultimate use.

It has been heretofore proposed to product flat glass by floating a ribbon or sheet of glass upon the surface of a bath of molten metal. The product produced by this process has surfaces which differ somewhat from each other. The top surface thereof, because of the heat involved, has a fire-finished surface. The bottom of the ribbon in contact with the molten metal is flat and has a finish similar in appearance to a fire-finished surface.

When producing float glass of compositions approaching that of commercial plate and window glass or like soda-lime glasses, and using molten metal, such as a bath of tin or tin alloy, molten glass poured directly onto the bath of metal ultimately will attain an equilibrium thickness of approximately ¼ inch (hereinafter sometimes called "equilibrium thickness"). Even a preformed ribbon of glass of a thickness different from the equilibrium thickness when remelted while supported on the molten metal, will nevertheless seek the equilibrium thickness. Heretofore, when thinner glasses were desired, it was considered necessary to attenuate the ribbon of glass while in molten condition to produce thicknesses of glass differing from the equilibrium thickness or to subject a stiffened ribbon or sheet of a different thickness to only a surface melting treatment. Attenuation of the glass always introduces speed change problems with resultant dependent variables, such as ribbon width, etc. The attenuated glass is also inclined to have surfaces of inferior quality because of localized temperature differences which result in non-uniform attenuation. Thus, attenuation of glass to produce a ribbon of a thickness differing from equilibrium thickness is to be avoided if at all possible.

Molten glass on a gaseous fluid support will also attain an equilibrium thickness of approximately ³⁄₁₀ inch, which is greater than the thickness desired for laminating as desired for automotive use. Here again, attenuation of the glass is to be avoided when a gaseous fluid support is substituted for a metal bath and it is desirable to produce glass of less thickness than equilibrium thickness.

The need for glass of thickness different from the equilibrium thicknesses is great. For example, the majority of laminated glass assemblies useable in the automotive industry are constructed of two pieces of glass, each of a thickness less than the equilibrium thickness (usually of the order of ³⁄₁₆ or ⅛ inch) with a layer of plastic sandwiched therebetween.

The equilibrium thickness of the glass is that thickness defined by the surface tension and gravitational forces which act on the glass when in a molten state. At equilibrium thickness, there is a balance of forces acting on the glass, so that no change in thickness occurs; and, in the absence of external forces acting on the glass, it will reach a normal equilibrium thickness.

According to this invention, it has been found that glass of conventional plate and window composition and of any desired thickness different from equilibrium thickness can be produced by supporting at least the major central area of a sheet or ribbon of glass on a fluid support, either liquid or gaseous, heating the glass to a temperature above that at which the glass flows, permitting the marginal edges to assume equilibrium thickness, supporting the edges at a different level than the central supported area and maintaining the entire top surface of the glass in substantially the same plane. The thickness of the central area of the glass is controlled by the selection of the difference in support level between the edges of the glass and the central area thereof. The width of the edges of the glass is apparently independent of the width of the central area of the glass. However, it has been found that the edges permitted to assume equilibrium thickness should not be less than 1 inch wide and are preferably 2 to 6 inches wide. They may be wider; however, if they are to be merely trimmed and discarded, economy of operation would dictate the narrowest edge possible with consideration of stability of production. Of course, it is possible to produce glass of at least two different thicknesses, if desired, by proper choice of edge width.

After the glass has been so supported and heated for a length of time sufficient to smooth-out the surfaces, it is cooled and then removed from its supports. Because of the temperature involved, the glass attains surfaces characteristic of fire-finished surfaces, so that little or no subsequent surfacing is required for ultimate use.

One effective method of practicing the invention is to presize the glass to its desired thickness, for example, less than equilibrium thickness, and deliver the glass into a tank so that its major central area is supported on a bath of molten metal, such as tin or tin alloy. An inert gas, such as nitrogen or the like, is supplied to the tank to prevent oxidation of the metal of the bath. The glass is heated to a temperature at which the glass flows, such as above 1800° F.

The edges of the ribbon are permitted to assume equilibrium thickness, so as to be supported on edge-supporting baths of molten metal, such as tin or tin alloy at lower levels than the central supporting bath. The difference in support levels is determined by the difference between equilibrium thickness and the desired formed thickness. The glass width, of course, becomes less because of the edge growth, so that the tank may be designed accordingly. After a sufficient length of time has elapsed during which the glass attains its fire-finished surfaces, the glass is cooled while still supported. After the temperature has been sufficiently reduced for the glass to be mechanically handled without surface damage, it is removed from the supporting bath.

The glass may be also presized with the desired sectional configuration, so as to reduce the length of the treating tank in that the ribbon may then be delivered directly onto its bi-level supporting baths. In addition, the glass may be formed directly on the supporting baths by delivering molten glass from a tank directly onto the baths. Again, the desired thickness of glass is controlled by selecting the difference in level between the supporting baths.

If a ribbon of glass of a thickness other than that which is desired is supplied to the metal bath then, because of the characteristic of molten glass to flow, a ribbon of the desired thickness can be produced by proper selection of the metal levels in the tank compartments.

A similar process is followed when using a gaseous fluid for support and treating the glass, it being necessary to select the proper temperatures and gaseous pressures to achieve the desired results. Apparatus for proceeding with a gaseous fluid as well as with molten metal will be later described in detail.

As described, the initially formed ribbon is substantially uniform in thickness and growth of the marginal edges occurs during passage through the metal bath tank. It is possible to preform the ribbon so as to have enlarged edge portions and to deliver this formed, preshaped ribbon to the molten metal bath. While little or no growth of the edges occurs, the edges are permitted to move, so as to be displaced from the plane of the bottom central surface of the sheet.

To further describe the invention, attention is directed to the accompanying drawings in which like reference characters refere to like parts and in which:

FIG. 5 is a longitudinal sectional view of another form of apparatus for producing glass according to this invention;

FIG. 6 is a horizontal sectional view taken on line 6—6 of FIG. 5;

FIG. 8 is an enlarged sectional view of a module bed construction together with curves showing pressure profiles.

Figure 1:
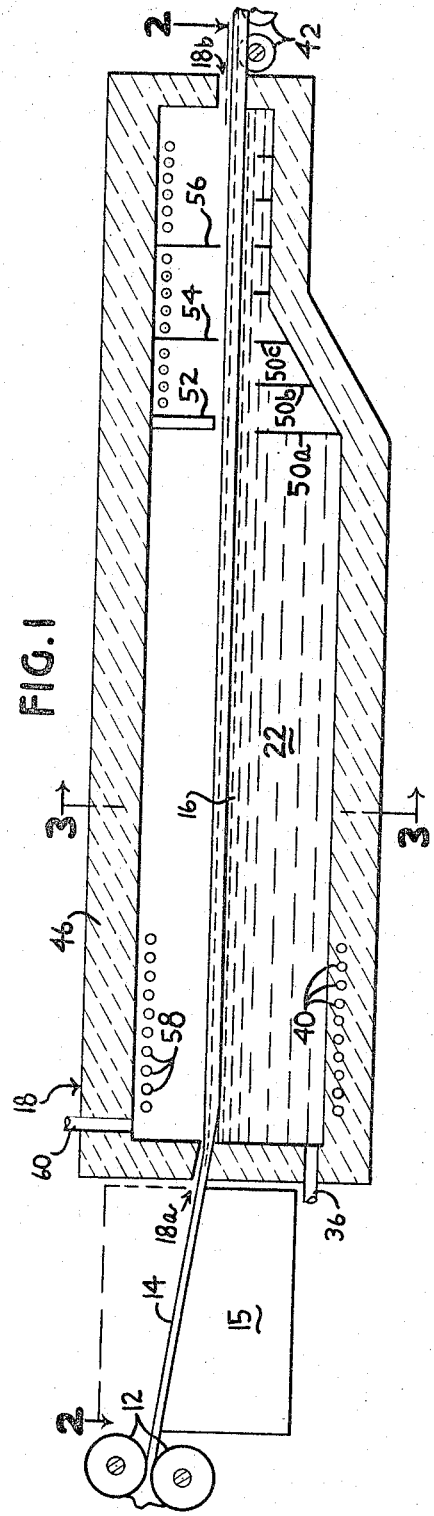
FIG. 1 is a diagrammatic longitudinal sectional view of an apparatus for producing glass according to this invention.
Figure 2:
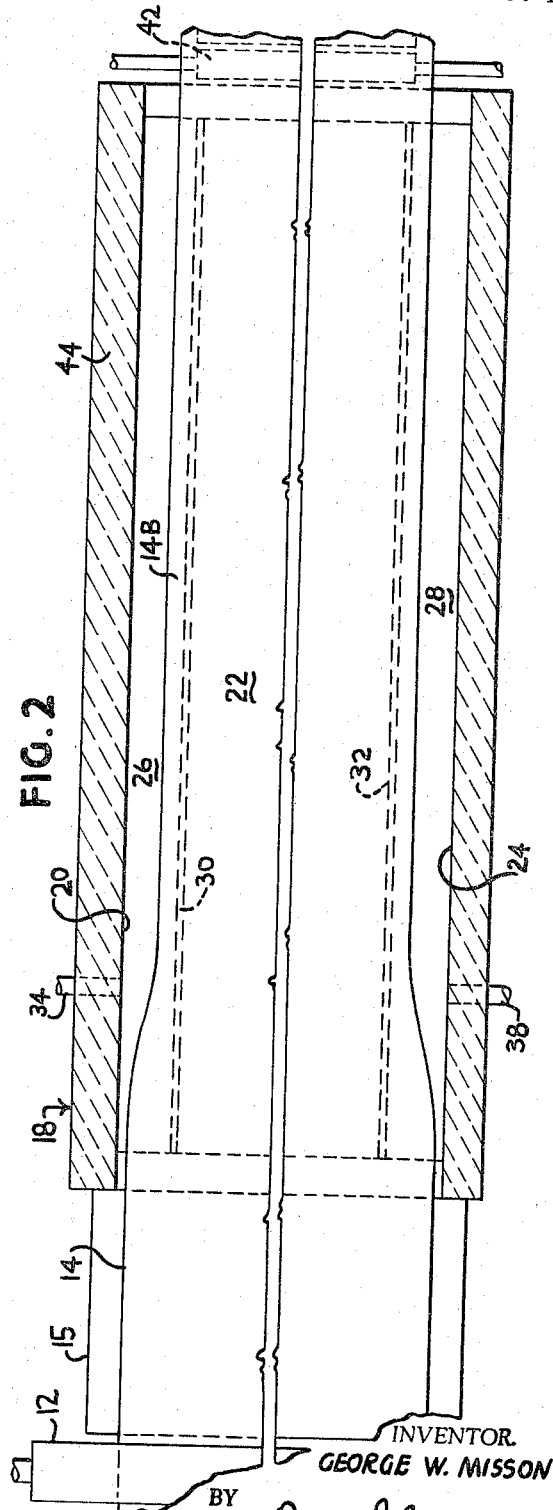
FIG. 2 is a horizontal sectional view taken on line 2—2 of FIG. 1.
Figure 3:
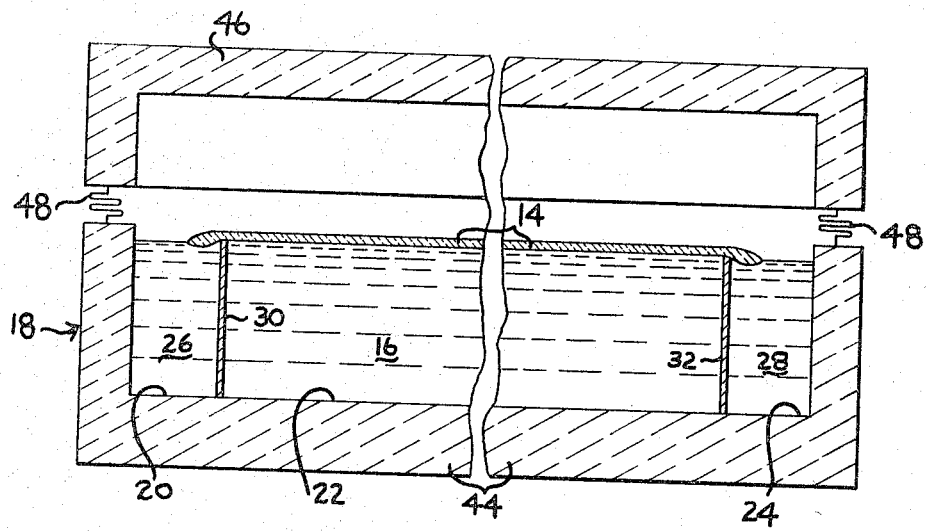
FIG. 3 is a cross-sectional view taken on line 3—3 of FIG. 1.

Reference is now made to the drawings which illustrate apparatus for producing glass thinner than equilibrium thickness. In FIGS. 1 to 3, there is shown a pair of forming rolls 12 at the delivery end of a glass melting tank or furnace of conventional construction (not shown) to form a ribbon of glass 14 which is delivered onto an apron arrangement 15 and its major central area, then delivered onto the surface of a bath of molten metal 16 contained within a tank 18. The ribbon, as formed, is substantially uniform in thickness which may be different from the equilibrium thickness of the glass. The tank 18 is divided into longitudinal compartments 20, 22 and 24 by relatively thin longitudinal walls 30 and 32 extending from entrance end to exit end of the tank. The central compartment 22 contains the bath identified as 16 while the compartments 20 and 24 also contain molten metal identified herein as baths 26 and 28. The described tank division arrangement permits individual control of metal level in the three compartments as through pipes 34, 36 and 38 communicating respectively with the compartments 20, 22 and 24. Suitable pumping means, not shown, are employed for metal level control purposes.

The molten metal of the baths has a density greater than that of the glass so that the central portion of the glass, at least, will be supported on the bath 16 throughout its passage from entrance end to exit end of the tank 18. As will be explained, the edge portions also will be supported on the surfaces of baths 26 and 28 for a portion of their passage through the tank 18. The metal may be tin, an alloy of tin, or the like.

In order to maintain the metal of the baths 16, 26 and 28 in molten condition, thermal regulating means, such as electrodes 40 may be located in the floor of the tank 18, as illustrated, or may be submerged within the molten metal so as to affect the temperature of the bath. The electrodes are connected to a suitable source of power (not shown) in a conventional manner. Each electrode may be individually energized and controlled, so as to provide a desired thermal gradient longitudinally of the tank 18. The glass ribbon 14, after treatment within the tank 18 is withdrawn from the tank without injury to the surfaces of the major, central area by any conventional means, such as pinch rolls, and carried away by a roller conveyor 42.

The tank 18 is constructed of a refractory bottom portion 44 and a refractory top portion 46 joined and sealed together except for an entrance 18a and an exit 18b, by a suitable sealing means, such as bellows-type members 48 which permits the top portion 46 of the tank to be raised from the bottom portion 44 for repairs, etc., without the necessity of removing refractory parts and the subsequent repair of removed parts. The bottom portion 46 contains the baths 16, 26 and 28 and the walls 30 and 32. The latter are preferably of a suitable refractory material which will withstand the elevated temperatures involved, will not contaminate the metal of the baths, and will not be wet by the glass. The non-wetting attribute is extremely important in that the dividing walls may actually contact the glass ribbon adjacent its edges.

Near the exit end 18b of the tank 18, the bottom portion 44 is subdivided into a plurality of transverse zones by upstanding submerged dividing walls or baffles 50a, 50b, 50c, etc., which preferably span all compartments or at least the central compartment 22. These walls or baffles define cooling zones and permit rather sharp temperature gradients to be established and maintained in the exit portion of the tank 18, so that the ribbon is properly cooled upon its exit therefrom.

The level of the baths are controlled by the inlet or outlet pipes 34, 36 and 38, as the case may be, and other means, such as weirs or the like which are not shown.

The space enclosed by the top portion 46 of the tank 18 is preferably subdivided by a transverse refractory wall 52 and baffles 54 and 56 in order to maintain desired thermal gradients and conditions above the baths 16, 26 and 28. To thermally condition this space, radiant heaters 58 are provided adjacent the roof of the tank 18. These radiant heaters are connected in a conventional manner to a source of electric power (not shown), preferably to be individually controlled for temperature gradient establishment. Any conventional control means may be used, so description of such means is not considered necessary or desirable.

A gas which is inert to the components of the bath, such as nitrogen or the like, is introduced, under pressure, into the space above the molten metal baths through a conduit (or conduits) 60 connected to a suitable source of the pressurized gas (not shown). The gas is preferably heated, so as to eliminate any chilling effects thereof. The pressure of the gas is just sufficient to maintain a proper atmosphere above the baths and to eliminate any entrance of air at the entrance and exits of the tank.

As shown, the formed ribbon 14 has a width greater than that of the bath 16, so that edge portions of the ribbon extend beyond the walls 30 and 32, subdividing the tank 18 into the compartments 20, 22 and 24. The ribbon 14, presized to a thickness different from equilibrium thickness (in the illustrated apparatus, to a thickness less than equilibrium thickness), is delivered into the tank so that its central area floats on the surface of the bath 16. By maintaining a positive supply of molten metal from the source, a low volume overflow from bath 16 into baths 26 and 28 may be maintained which eliminates glass to wall contact, i.e., contact of glass to walls 30 and 32. Controlled discharge of molten metal from baths 26 and 28 maintains their levels at those desired.

Adjacent the entrance end of the tank 18, the ribbon of glass 14 is heated to flowable condition and because of the difference in levels between the baths 16 and baths 26 and 28, the glass at the edges deforms into a mass of a thickness greater than that of the central area. Deformation of the ribbon edges is, of course, accompanied by a contraction in ribbon width. The contraction in width manifests itself only in the edge portions of the ribbon which are not supported on the bath 16.

Figure 4:
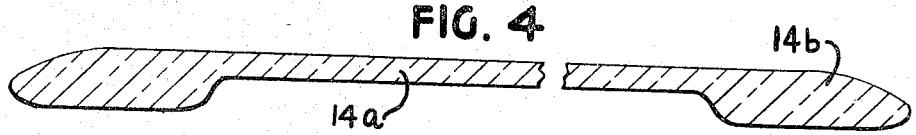
FIG. 4 is a transverse cross-sectional view of a glass sheet or ribbon made in accordance with this invention using the apparatus of FIGS. 1 to 3.

As the glass progresses through the treating tank 16, the edges thereof grow to equilibrium thickness and are supported on the baths 26 and 30 maintained at a lower level than the central bath 28. The difference in bath levels is chosen to be substantially the difference between the desired thickness 14A and the equilibrium thickness 14B, taking into consideration the displacement of the bath by the edges when a liquid bath is used, as indicated in FIG. 4. It is important that substantially the entire or major portion of the top surface of the glass is maintained in a single plane. The glass produced terminates in knife edges 14C, which is characteristic of glass produced on a molten bath.

In the above, the ribbon has been described as being preformed as one of substantially uniform thickness. The ribbon could be preformed as one with enlarged edges without departing from the spirit of this invention. To do so would require a modification of forming rolls and entrance configuration of the tank.

The temperature established in the fore part of the tank 18 is such that the glass is heated or maintained in flowable condition. Toward the exit end, beyond the wall 52 and the baffle 50a, the temperature is reduced to a value low enough to ensure delivery of a stable ribbon which is not marred by contact with the mechanical discharge means. The rate of movement of the ribbon through the tank 18 is controlled, so as to ensure a smoothing of the surfaces of the ribbon and this, in general, is best accomplished by bringing a section of the ribbon to molten, flowable, state.

Figure 7:
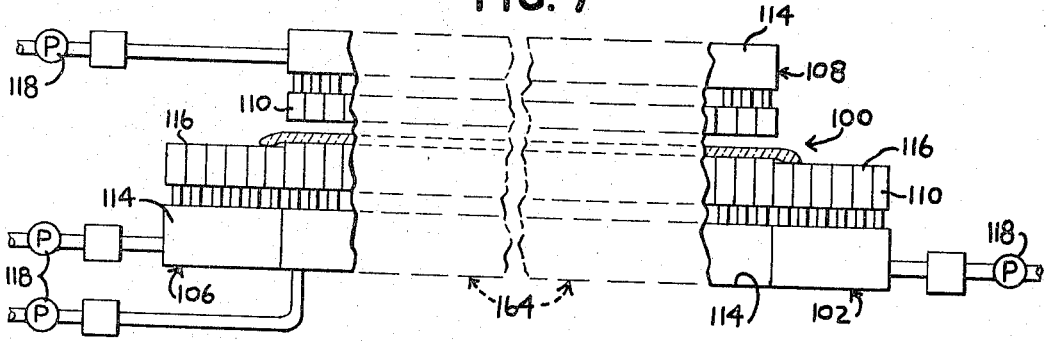
FIG. 7 is a cross-sectional view taken on line 7—7 of FIG. 5.

Another form of apparatus useful for performing the method of this invention is illustrated diagrammatically in FIGS. 5 to 7, to which attention is now directed. In this embodiment, a gaseous fluid, such as air, is used to treat the glass, including the support thereof above a predetermined plane.

In this embodiment, there is included the forming rolls 12 to form a ribbon of glass 14 delivered over an apron arrangement 15 to a treating apparatus generally identified as 100 through which the glass passes to conveyor rolls 42 for cutting to usable sizes. This treating apparatus has a lower portion divided into three longitudinal sections 102, 104 and 106 and an upper section 108 coextensive with the central lower section 104. The upper section 108 supplies heat to the system to maintain the glass at the proper temperature for its treatment when passing through the apparatus. Other heating means could be used if desired. The upper section, because of its construction, however, insures a substantially uniform temperature throughout its extent. No upper sections are required above and coextensive with the sections 102 and 106. The section 104 is the widest of the three lower scetions and is fixed in elevation. The narrow sections 102 and 106 are preferably adjustable in height and during use are generally below the central section 104. For temperature control purposes, all sections are divided laterally into subsections identified with the suffixes a, b, c, d and e.

As is illustrated, the various sections of the treating apparatus are constructed of beds of modules 110 arranged in a mosaic pattern. The beds correspond to the various sections of the treating apparatus. In the illustrated embodiment, all modules in each bed have their outer termini of rectangular configuration and lie in a common plane. The modules 110 are arranged in each bed in successive rows crossing the intended path of travel of the ribbon of glass 14. In the particular embodiment illustrated, each row of modules is at an angle of substantially 90 degrees from the path of travel of the ribbon and is spaced closely adjacent the next row as hereinafter described in more detail.

Each module 110 has a stem 112 of smaller cross-sectional area than the upper terminus and each opens into a plenum chamber 114 positioned either below or above the path of the glass depending on the particular module location with respect to the glass. Each module is substantially enclosed and separated from each other by an exhaust zone identified as 116 on the drawings.

A gas, such as air, is supplied to each plenum chamber 114 by a blower 118 (at least one for each section and sub-section) under a positive pressure. In order to treat the glass, the gas is preheated by a heater 120. The pressure of the gas supplied to the plenum chambers depends upon its location with respect to the glass, i.e., upper or lower, and the temperature of the gas depends upon the particular section and sub-section of the apparatus.

Exhaust gas flows through exhaust spaces 116 to the atmosphere.

The glass ribbon 14, after passing over the apron 15 from the forming rolls 12 is delivered to the treating apparatus 100. Within the apparatus the glass is heated to its melting temperature, held at that temperature for a sufficient length of time to fire-finish the surfaces and then its temperature is reduced so that it is delivered to the rolls 42 at such temperature that its surfaces are not harmed by contact with mechanical means.

The gaseous fluid is supplied to each lower plenum chamber 114 by a blower 118 under a positive pressure sufficient to support the ribbon a predetermined distance above the lower module beds and spaced from the upper module bed and at such temperature that the ribbon becomes molten, so that the edges of the ribbon grow in thickness and are deformed in the same manner as when a molten metal supporting bath is used. The pressure of the gaseous fluid supplied to the central module beds must be sufficient also to oppose the gaseous pressure being supplied to the upper module bed, being supplied at proper temperature and pressure by a blower and heater 120. Generally, however, it is sufficient that the upper module beds only supply the heat necessary for maintaining or obtaining the desired temperature for treating the glass. Of course, it is possible to eliminate the top module bed and replace same with a heating roof, so as to heat the glass to a temperature at which it flows, and produce the desired surface.

As in the previously described embodiment, the normal force balance which would result in a ribbon of glass of equilibrium thickness in the case of a gaseous fluid is approximately 0.3 inch. Having the lower edge module beds at a lower level than the lower central module bed permits the edges to grow to equilibrium thickness and produce a thinner central area. Gaseous fluid must be supplied to the edge modules to prevent engagement of the glass therewith.

After the edge has been formed and the surface of the central portion improved, the glass passes through the sections of the apparatus to which the gaseous fluid is supplied at progressively lower temperatures for permitting exit of the glass at a temperature permitting the handling thereof without surface damage.

In accordance with the teachings of this invention, highly developed and refined supporting and gas applying apparatus are provided to prevent the distortion of glass at deformation temperature. It is important in the process to have a very large proportion of the glass sheet or plate supported by a uniform force and to uniformly apply gas to the upper surface of the glass. This prohibits flowing the gas in a lateral direction between a bed and the glass because of the creation thereby of a progressive pressure drop along the path of flow and, hence, a non-uniform force. Furthermore, gas introduced from a plurality of points beneath or above the glass is exhausted beneath the adjacent area rather than merely by lateral flow to the glass edges to prevent a pressure build-up centrally of the glass sheet that may otherwise tend to cause thinning of the glass in a central area. The gas, having exhausted to zones spaced from the termini of the modules 110 and adjacent the stems thereof, then flows principally to the sides of the bed through the exhaust channels 116 and through ducts 122.

Of course, if the gas discharge zones are small in comparison with the exhaust areas, the gas pressure will not be substantially uniform. If the exhaust areas are large in magnitude, thinner sheets of glass overlying these areas will have a tendency to sag. Conversely, if the support areas are too large and exhaust areas too small, thinning of the glass in a central area tends to occur. Also, the pressure differential between the net supporting pressure and the exhaust pressure must be controlled to avoid sagging of the glass.

Finally, it is important that the gas be discharged onto the glass in the form of a diffused and relatively small gas flow to provide substantially uniform pressure across the width of the glass, thereby avoiding deformation, such as dimpling, from velocity pressure due to the direct impingement of localized jets of gas against the glass surfaces.

The module embodiment illustrated in FIG. 8 when assembled to form a bed and suitably supplied with gas from a plenum chamber 114 in a manner to be described in more detail, provides the uniformity required to process glass at elevated temperatures substantially free from distortion in the manner herein disclosed.

As shown in FIG. 8, each module forms an open-topped chamber, being essentially closed on its other sides, the upper terminus of which defines a zone of substantially uniform gas pressure, a profile of which is diagrammatically shown below the schematic view of the module. The pressure is exerted by gas supplied to each module from the supporting plenum chamber 114 by way of the hollow supporting stem 112. A nozzle 126, in threaded arrangement with an opening in the base of the module and having a bore 128 connected with the bore 130 of the module stem 112, provides a gas inlet to the module chamber and also functions to diffuse the gas by changing the direction of flow to a horizontal direction as the gas escapes and expands into the module chamber through a plurality of bores or orifices 132 in the nozzle thus creating a relatively quiescent pressure zone over the module. The orifices are so disposed to prevent direct impingement of pressurized gaseous fluid against the glass surface, so as to prevent dimpling of the glass from the velocity pressure of a localized jet of gas. They deliver the gas to the module in a path which is initially out of the path of the glass. As shown in FIG. 8, the initial path is toward the module side wall below the outer edge thereof. However, the initial path may be downward, or as a horizontal spiral, or may be baffled or otherwise obstructed as long as it does not initially impinge against the glass. By feeding the gas into the large module chamber through a conduit or orifice which is smaller in cross-section than the module, the gas diffuses into the gas of the chamber, producing a diffused flow, thus ensuring uniform pressure across the outer edges of the module.

Pressure profiles across the outer terminus of a module may be determined in the following manner: A pressure sensing plate having a small hole therethrough is positioned above a module and spaced from the upper terminus thereof a distance corresponding to the height of a supported sheet, e.g., 0.010 inch. A pressure transducer is connected to the sensing hole and the electrical output of the pressure transducer is connected to a recorder which will trace pressure variations on one axis and displacement of the pressure sensing plate on the other axis. The pressure transducer controls the displacement of the recording device along, e.g., the Y-axis of the graph. A potentiometer, the shaft of which is rotated by relative horizontal movement between the sensing plate and the module, translates such movement to an electrical signal which controls the displacement of the recording device along the other, or X-axis, of the graph.

Most advantageously, the relatively small size of orifices 132 of nozzle 110 provides a drop in gas pressure from the interior of the plenum to the interior of the module and, in so doing, performs three important functions: first, it prevents modules not covered by the moving glass from allowing the rapid escape of gas from the common plenum, which would reduce the pressure in the plenum and, hence, in the covered modules; second, it prevents variations of load above a module from affecting the flow of gas from the plenum into the module; and, third, it diminishes the effect of any slight variations in plenum pressure upon the pressure within the module. With this arrangement, the gap between the upper terminus of the module and the lower surface of the supported glass becomes self-adjusting to a uniform size about the entire upper periphery of the module, which size is a function of the weight of the glass supported plus the pressure of the gas applied to the upper surface of the glass. This occurs because the flow of gas from the plenum through the module and to the exhaust area passes through two restrictions: the orifices 132 in the base of each module, and the gap between the upper terminus of the module and the glass. Because of the size of the orifices 132, there will be a substantially constant pressure drop through the orifices from the plenum to the module.

The pressure per unit area of cross-section across the module is, under normal equilibrium conditions, equal to the weight per unit area of supported surface of the glass which it supports plus the pressure of the gas applied to the upper glass surface. However, the pressure drop between the plenum and the interior of the module is held high, usually at least twice and even as high as 50 to 100 times the pressure drop between the module interior and the exhaust area. Consequently, the gap between the module and the glass adjusts automatically in size (i.e., changing the height of support of the glass from the module) until this pressure is obtained thereby compensating for variations. Thus, if the gap becomes very small due to a heavy piece of glass, or an external force upon the glass, or a change in applied pressure (for example, pressure applied by the module on the opposite side of the glass), the pressure within the module will increase until the pressure balances the load or until plenum pressure is reached as the gap approaches zero. If the gap were to diminish to zero, there would be, of course, insufficient pressure to support the load. This cannot occur since, as the glass approaches the upper edge of the module, the pressure in the module rises toward the plenum pressure which is always well above that necessary to support the glass. Hence, the glass will be raised from the lower module by the gas in the module pressing against the lower surface of the glass under any module pressure greater than the weight of the glass, thus increasing the size of the gap and reducing the module pressure due to escape the gas over the edges thereof. In this manner, the gap is self-adjusting to a uniform size, dependent upon the weight of the glass, the plenum pressure and the size of the orifices.

The rate at which the pressure within the module builds up with decrease in the gap is a function of the rate of gas flow into the module and the volume of gas in the module. Hence, the orifice must not be so small for a given plenum pressure as to restrict the flow of gas into each module to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the outermost module edge.

Modules of small volume are more responsive for this purpose than are larger modules for a given flow rate. Generally, the modules herein contemplated have a volume desirably less than about 2 cubic inches especially when opposite the molten bottom surface of the glass. By forming the support bed and upper bed from identically constructed modules and supplying them with uniform but not necessarily equal pressure, each lower module will support the overlying portions of the glass along a desired surface and each upper module will apply a substantially uniform pressure to the glass. The proximity of adjacent modules in the lower bed results in substantially uniform support under the entire area of the glass and assures a substantially flat product and one free of distortion.

As shown in FIG. 8, the gas within each module escapes across the outer terminus of the module walls to zones of lower pressure between adjacent modules. This lateral flow of gas between the module wall and the glass results in a progressive pressure drop across the width of the wall. However, the resulting area of non-uniform pressure directly adjacent the wall thickness and the area of reduced pressure at the exhaust zones between the modules is minimized by utilizing thin module walls (rarely averaging greater than 3/8 inch) and relatively low gas flow which permits the exhaust areas between the modules to be kept small yet adequate to exhaust the gas without building up back pressure. This is shown by the module pressure profile at the bottom of FIG. 8 wherein the dips shown in the pressure profile at the exhaust areas are sufficiently small to have no adverse effect on the moving supported material. Thus, a substantially uniform average module pressure is achieved, as shown in the broken line curve.

Each module 110 exhausts radially in all directions to the surrounding zones of lower pressure, resulting in the pressure profile shown. The pressure over the exhaust areas, while lower than the module pressure, generally is slightly above ambient pressure to provide a gas flow from the glass surface to the exhaust channel beneath the modules.

The modules disclosed herein may vary in size and contour. Square modules having outer dimensions of approximately one inch have been found to be generally satisfactory for the described treatment of the glass, the module size may well vary in dimensions from about 1/8 to 1½ inches on each side and need not be square, there being numerous other geometric or irregular shapes equally suitable. To achieve satisfactorily uniform characteristics for glass or other material heated to a deformation temperature, the distance across the outer terminus or each module forming the bed should be no more than ½ of the correspondingly oriented dimension of the material and preferably should be less than 1/5 thereof. The module depth from the bottom to the open top may vary but must be substantial. Normally, it will be at least ¼ inch deep and in most cases ½ to 1½ inches or more.

In the embodiment just described, the edge module beds have been disclosed as being at lower levels than the central module bed. It is possible to construct the treating apparatus with all beds at the same level and to supply the supporting gas to the edge modules at lower pressure than supplied to the central modules. The deformation of the edges would be limited in this case because of the necessity of maintaining the edges free of contact with the module beds.

In each of the embodiments described, the glass moves through the treating apparatus wherein its temperature is maintained above that at which (at least the surface thereof) the glass melts. The time required for treating the glass is chosen to permit the surfaces thereof to smooth out so as to eliminate or very materially reduce the need for subsequent finishing. To use the glass so produced and treated, it is only necessary to trim the edges of the ribbon which have sagged and relegate them to cullet.

It is also possible to perform the broad method by supporting at least the central area of the formed sheet on a bed of a material which does not wet the glass, such as graphite, and permit the edges thereof to grow.

It is also possible to produce sheet glass with a thickness greater than equilibrium. This would entail the displacement of the edge portions from the plane of the bottom surface of the sheet, as for example, displacing the central area below the level of the edges. As readily seen, the module construction easily lends itself to this modification.

*Example I*

A ribbon of soda-lime glass of conventional sheet or plate glass composition is formed by forming rolls to a width of 100 inches and a thickness of 3/16 inch. The so-formed ribbon is delivered into a treating apparatus so that its central area is supported on a bath of molten tin. The bath of molten tin has a total width of 120 inches which includes a central bath of 96 inches in width. The edges of the ribbon of glass overhang the central bath of molten tin and are unsupported thereby. The temperature of the glass is elevated to a temperature of 1800 to 1900 degrees Fahrenheit or to that temperature to which its surface flows while retaining the general configuration of the ribbon. The ribbon is deformable at that temperature and the edges thereof grow in thickness and deform so as to contact pools of molten tin maintained approximately .024 inch below the plane of the main molten bath. The edges of the ribbon of glass grow to equilibrium thickness, i.e., ¼ inch and are supported on the edge baths of molten metal. The width of the ribbon is reduced from its initial width of 100 inches to a final width of approximately 99 inches. The thickness of the major central area of the ribbon is maintained at its original thickness of 3/16 inch. After a time of five minutes, the temperature of the ribbon is reduced to 1100 degrees Fahrenheit or less and is removed from the treating apparatus without damage to its surfaces. The major central area of the ribbon exhibits a brilliant fire-finished surface.

What is claimed is:

1. A method of manufacturing flat glass having a thickness on the central portion thereof less than the normal equilibrium thickness comprising:
   forming a horizontally disposed elongated supporting surface for supporting molten glass, said supporting surface including an elongated central portion having a level upper surface between elongated edge portions each having an upper surface extending laterally of said central portion,
   adjusting the elevation between the level of the upper surface of said central portion and the level of the upper surfaces of the adjacent edge portions until the level of said upper surface of said central portion is above the level of said edge portions,
   depositing a mass of molten glass at a temperature throughout the mass thereof at which it will flow on said elongated supporting surface,
   flowing said mass of molten glass and the free edges thereof laterally over said central portion, and over the surfaces of said edge portions toward equilibrium thickness,
   moving said molten glass longitudinally over said elongated supporting surface,
   cooling the leading portion of said molten glass to fix its cross section, and
   removing the cooled glass from said elongated supporting surface to provide a ribbon of glass having a thickness in the central portion thereof less than the equilibrium thickness.

2. A method as recited in claim 1 wherein said elongated supporting surface comprises molten metal including molten tin.

3. A method of manufacturing flat glass having a thickness in the central portion thereof greater than the normal equilibrium thickness comprising:
   forming a horizontally disposed elongated supporting surface for supporting molten glass, said supporting surface including an elongated central portion having a level upper surface between elongated edge portions each having an upper surface extending laterally of said central portion,
   adjusting the elevation between the level of the upper surface of said central portion and the level of the upper surfaces of the adjacent edge portions until the level of said upper surface of said central portion is below the level of said edge portions, depositing a mass of molten glass at a temperature throughout the mass thereof at which it will flow on said elongated supporting surface, flowing said mass of molten glass and the free edges thereof laterally over said central portion, and over the surfaces of said edge portions toward equilibrium thickness, moving said molten glass longitudinally over said elongated supporting surface, cooling the leading portion of said molten glass to fix its cross section, and removing the cooled glass from said elongated supporting surface to provide a ribbon of glass having a thickness in the central portion thereof greater than equilibrium thickness.

4. A method as recited in claim 3 wherein said elongated supporting surface comprises molten metal including molten tin.

References Cited by the Examiner

UNITED STATES PATENTS 3,223,501   12/1965   Fredley et al. ---------- 65—25

DONALL H. SYLVESTER, *Primary Examiner.*

A. D. KELLOGG, *Assistant Examiner.*